May 16, 1939.  W. A. WILSON ET AL  2,158,810
BEARING LUBRICATION
Filed July 1, 1938

WITNESSES:
James X. Mosser
E. H. Lutz

INVENTORS
WILLIAM A. WILSON, AND
HENRY F. SCHMIDT.
BY
A. B. Reavis
ATTORNEY

Patented May 16, 1939

2,158,810

UNITED STATES PATENT OFFICE 2,158,810

BEARING LUBRICATION

William A. Wilson, Swarthmore, and Henry F. Schmidt, Lansdowne, Pa., assignors to Westinghouse Electric & Manufacturing Company, East Pittsburgh, Pa., a corporation of Pennsylvania Application July 1, 1938, Serial No. 216,878

3 Claims. (Cl. 308—133)

Our invention relates to journal bearings and it has for an object to provide improved lubricating means therefor.

A further object of our invention is to provide a journal bearing with self-priming viscosity pumping means to effect lubrication thereof.

Figure 1:
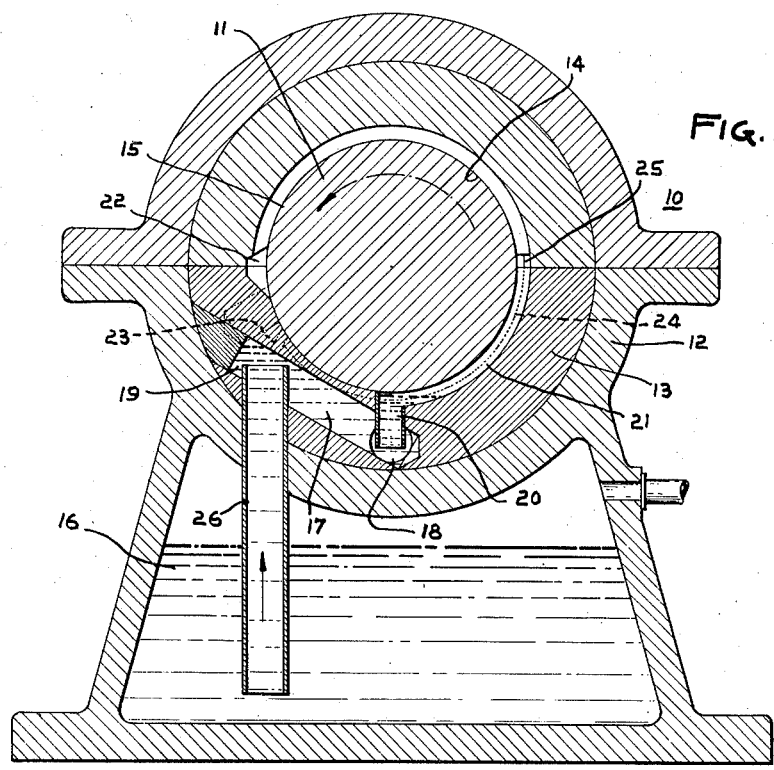
Figure 2:
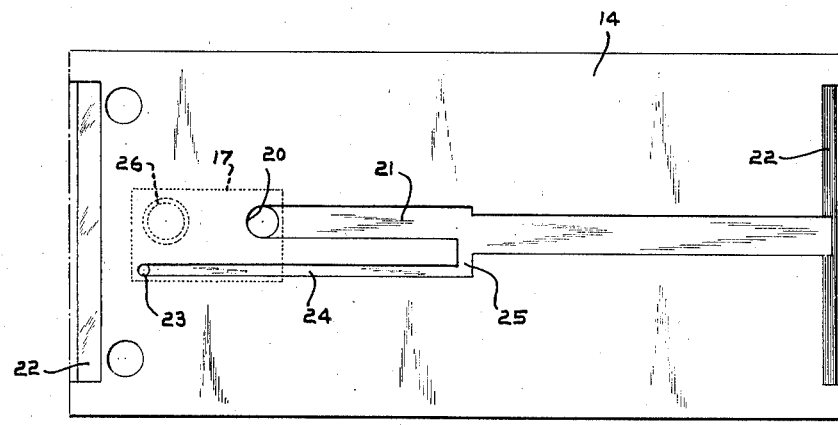

These and other objects are effected by our invention as will be apparent from the following description and claims taken in connection with the accompanying drawing, forming a part of this application, in which:

Fig. 1 is a transverse sectional view of a bearing incorporating our improved lubricating features; and Fig. 2 is a developed view of the interior of the bearing of Fig. 1.

In the drawing, there is shown a bearing, at 10, for the journal, at 11, the bearing preferably including a housing 12 and a shell 13, the latter having the inner bearing surface 14 cooperating with the external bearing surface 15 of the journal. As is customary, both the housing and the shell comprise upper and lower halves; and, hereinafter, the housing and the shell are collectively referred to as a "bearing", it being understood that this term is used in a general sense.

Referring now to the means for lubricating the bearing surfaces, the bearing 10 is preferably provided with a lower lubricant reservoir 16 and it is provided with a connecting chamber 17, the latter being arranged so that its lower end portion 18 extends below the lowermost portions of the cooperating bearing surfaces 14 and 15 and the upper end portion 19 extends thereabove.

A port 20 affords communication between the lower portion 18 of the chamber and the lowermost portions of the bearing surfaces and a channel 21 is formed in the bearing so as to intersect the bearing surface thereof, the channel communicating with the port 20 and extending circumferentially in the direction of journal rotation, as indicated by the arrow in Fig. 1. The end of the channel 21 remote from the port preferably communicates with a longitudinally extending channel 22 for distributing lubricant over the length of the bearing.

A vent port 23 connects the upper end portion 19 of the chamber 17 with the bearing surfaces at a region of the latter spaced from the port 20. Preferably, the port 23 communicates with the channel 24 formed in the bearing so as to intersect the bearing surface 14 and communicate with the channel 21 at an intermediate region thereof, as at 25 in Fig. 2.

A conduit 26 supplies lubricant from the reservoir 16 to the upper end portion 19 of the inclined chamber.

The apparatus described operates as follows:

Due to the inclination of the chamber 17 and the relative arrangement of ports and the passages associated therewith, such chamber normally operates to provide an intermediate reservoir or space in which lubricant accumulates. When the journal comes to a stop, a considerable quantity of lubricant is in the chamber 17 and remains there while the journal is not running. When rotation of the journal is started, oil in the port 20 supplied from the chamber 17 wets the surface of the journal and seals the port 23, thus permitting of the creation of a vacuous condition in the chamber 17 to establish flow of oil thereto from the reservoir 16, thereby providing for the continuous flow of oil to the viscosity pump groove or channel 21 and for the continuous supply of oil under pressure to the distributing groove 22.

As soon as an oil film is formed on the journal, the viscosity drag in the grooves 24 and 21 withdraws any air which may separate from the oil and collect at the upper end of the chamber 17 as well as air accumulating therein up to the time of priming.

The channel 24 extends circumferentially a sufficient distance to prevent the recirculation of air or oil through the ports 23 and 20 and the chamber 17 and thereby avoids diminishing the suction effect set up by priming. The chamber 17 is vented through the port 23 when the journal is stationary, preventing syphoning of the oil from the chamber 17 through the conduit 26 into the reservoir 16. Just as soon as priming is effected, the suction or entraining effect exerted by oil passing along the channels 21 and 24 assures of air being drawn along the channel 24 and mixed with the oil, whereby air will be removed from the port 23, the upper portion of the conduit 26 and the chamber 17 in such manner that the latter chamber and the pipe or conduit 26 provide a reliable suction passage for the viscosity pump. While the first effect following priming is to withdraw air in this manner, the operation is soon stabilized, the vent port 23 and the channel 24 being filled with oil. With stoppage of the journal, seepage of oil from the channels permits of the port 23 being rendered effective to vent the upper end portion 19 of the chamber 17 to prevent syphoning, as already described. Oil passing circumferentially along the channel 21 reaches the transverse groove 22 from which it is distributed substantially throughout the length of the bearing.

While we have shown our invention in but one form, it will be obvious to those skilled in the art that it is not so limited, but is susceptible of various changes and modifications without departing from the spirit thereof, and we desire, therefore, that only such limitations shall be placed thereupon as are imposed by the prior art or as are specifically set forth in the appended claims.

What we claim is:

1. The combination with a journal and a bearing having cooperating bearing surfaces, of means for lubricating said surfaces comprising a chamber formed in the bearing and having its lower end portion extending below the lowermost portions of said bearing surfaces and its upper end portion extending thereabove; a port affording communication of the lower portion of the chamber with the lower portions of the bearing surfaces; a channel intersecting the bearing surface of the bearing, communicating with said port, and extending away from the latter circumferentially in the direction of journal rotation; a vent port affording communication between the upper portion of said chamber with a region of the bearing surfaces spaced from said first port; and means for supplying lubricant to said chamber including a suction passage connected to the upper portion thereof.

2. The combination with a journal and a bearing having cooperating bearing surfaces, of means for lubricating said surfaces comprising a reservoir formed in the bearing and located below the bearing surface thereof; a chamber formed in the bearing and having its lower end portion extending below the lowermost portions of said bearing surfaces and its upper end portion extending thereabove; a port affording communication of the lower portion of the chamber with the lower portions of the bearing surfaces; a channel formed in the bearing so as to intersect the bearing surface thereof, communicating with said port, and extending away from the latter circumferentially in the direction of journal rotation; a vent port affording communication of the upper portion of said chamber with a region of the bearing surfaces spaced from said first port; and means for supplying lubricant from the reservoir to the upper portion of said chamber including a conduit having its inlet end communicating with the lower portion of said reservoir.

3. The combination with a journal and a bearing having cooperating bearing surfaces, of means for lubricating said surfaces comprising a chamber formed in the bearing and having its lower end portion extending below the lowermost portions of said bearing surfaces and its upper end portion extending thereabove; a port affording communication of the lower portion of the chamber with the lower portions of the bearing surfaces; a channel formed in the bearing so as to intersect the bearing surface thereof, communicating with said port, and extending away from the latter circumferentially in the direction of journal rotation; a vent port affording communication of the upper portion of said chamber with the bearing surfaces; a second channel formed in the bearing so as to intersect the bearing surface thereof, spaced axially from the first channel, and having its ends communicating with the vent port and with the first channel at a point intermediate the ends of the latter.

WILLIAM A. WILSON.
HENRY F. SCHMIDT.